United States Patent
Cann

(10) Patent No.: US 7,962,992 B2
(45) Date of Patent: *Jun. 21, 2011

(54) TOOTHBRUSH WITH ELASTOMER FILLED FLEXIBLE HEAD

(75) Inventor: David Victor Cann, Surrey (GB)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/317,842

(22) Filed: Dec. 23, 2005

(65) Prior Publication Data

US 2006/0130257 A1  Jun. 22, 2006

Related U.S. Application Data

(63) Continuation of application No. 10/600,032, filed on Jun. 20, 2003, now abandoned, which is a continuation of application No. 10/132,976, filed on Apr. 24, 2002, now abandoned, which is a continuation of application No. 09/101,918, filed as application No. PCT/US97/00968 on Jan. 17, 1997, now Pat. No. 6,408,476.

(30) Foreign Application Priority Data

Jan. 18, 1996 (GB) .................................. 9601012.9

(51) Int. Cl.
*A46B 9/04* (2006.01)

(52) U.S. Cl. ............................ 15/167.1; 15/172; 15/201

(58) Field of Classification Search ................. 15/167.1, 15/172, 110, 201; *A46B 9/04*

See application file for complete search history.

(56) References Cited

U.S. PATENT DOCUMENTS

| | | | |
|---|---|---|---|
| 345,983 A | 7/1886 | Miller | |
| 669,402 A | 3/1901 | Rose | |
| 759,490 A | 5/1904 | Yates | |
| 882,021 A | 3/1908 | Schigelinsky | |
| 914,501 A | 3/1909 | McEachern | |
| 1,018,927 A | 2/1912 | Sawazin | |
| 1,578,074 A | 3/1926 | Chandler | |
| 1,691,863 A | 11/1928 | Van Sant | |
| 1,860,924 A | 5/1932 | Cooke | |
| 1,927,365 A | 9/1933 | Frolio | |
| 1,993,662 A * | 3/1935 | Green | 15/110 |
| 2,003,243 A | 5/1935 | Campbell et al. | |
| 2,122,619 A | 7/1938 | McMath | |

(Continued)

FOREIGN PATENT DOCUMENTS

CH  460 705  10/1968

(Continued)

OTHER PUBLICATIONS

Office Actions from U.S. Appl. No. 6,219,874 from May 21, 1998 through Jan. 14, 2000.

(Continued)

*Primary Examiner* — David A Redding
(74) *Attorney, Agent, or Firm* — George H. Leal; Jim Vago

(57) ABSTRACT

An electric toothbrush comprises a head having a bristle face and an opposite face, the head including a longitudinal groove filled with an elastomer; and a handle connected to the head and formed at least in part by a non-compressible material.

103 Claims, 2 Drawing Sheets

U.S. PATENT DOCUMENTS

| | | | |
|---|---|---|---|
| 2,172,624 A | 9/1939 | Romani | |
| 2,242,743 A | 5/1941 | Brown | |
| 2,244,098 A | 6/1941 | Busick | |
| 2,254,365 A | 9/1941 | Griffith et al. | |
| 2,266,195 A | 12/1941 | Hallock | |
| 2,274,042 A | 2/1942 | Cosby | |
| 2,312,828 A | 3/1943 | Adamson | |
| 2,438,268 A | 3/1948 | Bressler | |
| 2,443,297 A | 6/1948 | Bressler | |
| 2,476,201 A | 7/1949 | Ligoure | |
| 2,631,320 A | 3/1953 | Bressler | |
| 2,650,383 A | 9/1953 | Bressler | |
| 2,676,350 A | 4/1954 | Bressler | |
| 2,685,703 A | 8/1954 | Dellenbach | |
| 2,722,031 A | 11/1955 | Bressler | |
| 2,796,620 A | 6/1957 | Bressler | |
| 2,864,111 A | 12/1958 | Rotceig | |
| 3,152,349 A | 10/1964 | Brennescholtz | |
| 3,188,672 A | 6/1965 | Gary | |
| D201,867 S | 8/1965 | Newman | |
| 3,253,292 A | 5/1966 | Herschensohn | |
| 3,378,870 A | 4/1968 | Matsunaga | |
| 3,488,788 A | 1/1970 | Robinson | |
| 3,633,237 A | 1/1972 | Bagube | |
| 3,792,504 A | 2/1974 | Smith | |
| D239,221 S | 3/1976 | Wasserman | |
| 4,081,876 A | 4/1978 | Pugh | |
| D248,696 S | 8/1978 | Greenberg | |
| 4,263,691 A * | 4/1981 | Pakarnseree | 15/207.2 |
| D259,976 S | 7/1981 | Seelig | |
| D272,688 S | 2/1984 | Stocchi | |
| D272,689 S | 2/1984 | Stocchi | |
| D272,690 S | 2/1984 | Stocchi | |
| D273,635 S | 5/1984 | Stocchi | |
| D276,193 S | 11/1984 | Tanabe et al. | |
| 4,488,328 A | 12/1984 | Hyman | |
| D285,263 S | 8/1986 | Hill | |
| 4,633,542 A | 1/1987 | Taravel | |
| D289,703 S | 5/1987 | Yaffe | |
| D289,704 S | 5/1987 | Marthaler et al. | |
| 4,691,405 A | 9/1987 | Reed | |
| 4,694,844 A | 9/1987 | Berl et al. | |
| D292,448 S | 10/1987 | Vianello | |
| 4,712,267 A | 12/1987 | Cheng | |
| 4,776,054 A | 10/1988 | Rauch | |
| 4,800,608 A | 1/1989 | Key | |
| 4,864,676 A | 9/1989 | Schaiper | |
| 5,014,383 A | 5/1991 | Costar | |
| D319,148 S | 8/1991 | Emily | |
| 5,040,260 A | 8/1991 | Michaels | |
| 5,052,071 A | 10/1991 | Halm | |
| 5,054,154 A | 10/1991 | Schiffer et al. | |
| D324,775 S | 3/1992 | Kreisher et al. | |
| 5,121,520 A | 6/1992 | Brice | |
| D342,160 S | 12/1993 | Curtis et al. | |
| D342,162 S | 12/1993 | Curtis et al. | |
| 5,269,038 A | 12/1993 | Bradley | |
| 5,339,482 A | 8/1994 | Desimone et al. | |
| D351,732 S | 10/1994 | Dair et al. | |
| 5,353,464 A | 10/1994 | Atkins et al. | |
| 5,373,602 A | 12/1994 | Bang | |
| 5,398,369 A | 3/1995 | Heinzelman et al. | |
| 5,435,032 A | 7/1995 | McDougall | |
| D360,760 S | 8/1995 | Halm | |
| 5,465,450 A | 11/1995 | Humphries | |
| 5,628,082 A | 5/1997 | Moskovich | |
| 5,651,158 A * | 7/1997 | Halm | 15/167.1 |
| 5,758,383 A * | 6/1998 | Hohlbein | 15/167.1 |
| 5,761,759 A | 6/1998 | Leversby et al. | |
| 5,774,923 A | 7/1998 | Halm | |
| 5,813,079 A | 9/1998 | Halm | |
| 5,839,149 A | 11/1998 | Scheier et al. | |
| D404,205 S | 1/1999 | Hohlbein | |
| D404,206 S | 1/1999 | Hohlbein | |
| D407,223 S | 3/1999 | Van Gelder | |
| 5,875,510 A * | 3/1999 | Lamond et al. | 15/167.1 |
| 5,946,758 A * | 9/1999 | Hohlbein et al. | 15/167.1 |
| 5,946,759 A * | 9/1999 | Cann | 15/167.1 |
| 5,987,688 A | 11/1999 | Masterman et al. | |
| 5,991,958 A * | 11/1999 | Hohlbein | 15/167.1 |
| D421,844 S | 3/2000 | Stark et al. | |
| 6,073,299 A * | 6/2000 | Hohlbein | 15/167.1 |
| 6,115,870 A | 9/2000 | Solanki et al. | |
| 6,151,745 A | 11/2000 | Masterman et al. | |
| 6,178,582 B1 | 1/2001 | Halm | |
| 6,219,874 B1 * | 4/2001 | van Gelder et al. | 15/167.1 |
| 6,276,019 B1 | 8/2001 | Leversby et al. | |
| 6,276,020 B1 | 8/2001 | Leversby et al. | |
| 6,314,605 B1 | 11/2001 | Solanki et al. | |
| 6,314,606 B1 * | 11/2001 | Hohlbein | 15/167.1 |
| D456,139 S | 4/2002 | Hohlbein | |
| 6,408,473 B1 | 6/2002 | Kessler | |
| 6,408,476 B1 * | 6/2002 | Cann | 15/167.1 |
| D463,133 S | 9/2002 | Hohlbein | |
| 6,442,786 B2 | 9/2002 | Halm et al. | |
| 6,442,787 B2 * | 9/2002 | Hohlbein | 15/167.1 |
| 6,505,373 B2 | 1/2003 | Van Gelder et al. | |
| 6,675,428 B2 | 1/2004 | Halm | |
| RE38,521 E | 5/2004 | Halm | |
| 6,807,703 B2 | 10/2004 | Van Gelder et al. | |
| 6,996,870 B2 * | 2/2006 | Hohlbein | 15/110 |
| 2001/0014991 A1 | 8/2001 | Halm et al. | |
| 2002/0017003 A1 | 2/2002 | Kramer et al. | |
| 2005/0000043 A1 | 1/2005 | Chan et al. | |
| 2006/0117508 A1 | 6/2006 | Hohlbein | |
| 2008/0307596 A1 | 12/2008 | Hohlbein | |
| 2009/0013484 A1 | 1/2009 | Masterman et al. | |
| 2009/0025162 A1 | 1/2009 | Chan et al. | |
| 2009/0044357 A1 | 2/2009 | Chan et al. | |

FOREIGN PATENT DOCUMENTS

| | | |
|---|---|---|
| DE | 37 37 223 A1 | 5/1989 |
| DE | A 39 23 495 | 1/1991 |
| DE | 41 27 621 A1 | 2/1993 |
| DE | 9400926 | 5/1994 |
| DE | 199318148 U1 | 5/1994 |
| DE | 199402125 U1 | 7/1994 |
| EP | 0 504 571 B1 | 1/1996 |
| EP | 761124 A1 | 3/1997 |
| EP | 0 648 448 B1 | 9/1998 |
| EP | 1057425 A2 | 12/2000 |
| EP | 0 873 066 B1 | 6/2002 |
| EP | 0 976 345 B1 | 6/2002 |
| EP | 1300096 A2 | 4/2003 |
| EP | 990401 B1 | 7/2003 |
| FR | 442832 | 9/1912 |
| FR | 567187 | 2/1924 |
| FR | 792476 | 10/1934 |
| FR | 1524055 | 5/1966 |
| FR | 2559361 | 8/1985 |
| FR | 2 652 245 | 9/1989 |
| GB | 1 006 669 | 10/1965 |
| GB | 2019676 | 12/1992 |
| GB | 2019677 | 12/1992 |
| JP | H9-19323 | 1/1997 |
| KR | 71-844 | 6/1971 |
| WO | WO 8001135 | 6/1980 |
| WO | WO 9119438 | 12/1991 |
| WO | WO 92/17093 | 10/1992 |
| WO | WO 9217092 | 10/1992 |
| WO | WO 93/14671 | 8/1993 |
| WO | WO 94/05183 | 3/1994 |
| WO | WO 95/06420 | 3/1995 |
| WO | WO 96/02165 | 2/1996 |
| WO | WO9602165 A1 | 2/1996 |
| WO | WO 97/24949 | 7/1997 |
| WO | WO9724048 A1 | 7/1997 |
| WO | WO9725900 A1 | 7/1997 |
| WO | WO 99/23910 | 5/1999 |
| WO | WO 99/37180 | 7/1999 |

OTHER PUBLICATIONS

Office Actions from U.S. Appl. No. 6,505,373 from May 29, 2001 through Mar. 8, 2002.

Office Actions from U.S. Appl. No. 6,807,703 from Mar. 5, 2008 through Apr. 19, 2004.

Office Actions from U.S. Appl. No. 6,408,476 from Oct. 29, 1999 through Jul. 25, 2001.
Office Actions from U.S. Appl. No. 10/132,976 from Nov. 15, 2002 through Dec. 20, 2002.
Office Action from U.S. Appl. No. 10/600,032 dated Jun. 28, 2005.
Office Actions for U.S. Appl. No. 5,987,688 from Oct. 30, 1996 through May 26, 1999.
Office Actions for U.S. Appl. No. 6,151,745 from. Dec. 6, 1999 through Feb. 28, 2000.
Office Action for U.S. Appl. No. 08/554,931 dated Aug. 27, 1996.
European equivalent EP 955,833 Opposition Documents.

DM/032609 (Application date Nov. 17, 1994, publication date May 17, 1995), sales brochure of Aug. 1995, quotations, original promotional sample of the Trisa "flexActiv" toothbrush produced in 1995 and another promotional sample from a subsequent production series.
An affidavit or witness testimony that the submitted promotional sample is an item offered for sale.
Paperwork for Opposition against EP Patent No. 0769920.
Paperwork for Opposition against EP 0577656.
File Wrapper for EP 0769920.

* cited by examiner

TOOTHBRUSH WITH ELASTOMER FILLED FLEXIBLE HEAD

CROSS REFERENCE TO CO-PENDING APPLICATIONS

This application is a continuation of U.S. application Ser. No. 10/600,032 filed Jun. 20, 2003 now abandoned, which is a continuation of U.S. application Ser. No. 10/132,976 filed Apr. 24, 2002 now abandoned, which is a continuation of U.S. application Ser. No. 09/101,918 filed Aug. 20, 1998 now U.S. Pat. No. 6,408,476, which was the National Stage of International Application No. PCT/US97/00968, filed Jan. 17, 1997, the substances of which are incorporated herein by reference.

FIELD OF THE INVENTION

The present invention relates to a toothbrush, more particularly to a toothbrush with a comprising regions of elastomer in both the head and the handle wherein one or more elastomer supply channels connect the regions so that they can all be filled with elastomer from a single injection point.

BACKGROUND OF THE INVENTION

The configuration of human teeth requires that the ideal bristle contour for toothbrushes for brushing the buccal or outside surfaces of teeth be concave and that the ideal bristle contour for brushing the lingual or inside surfaces of teeth be convex. Most brushes have a single piece head which is of comparable thickness to the handle and which is relatively rigid and of a fixed curvature or configuration.

A further drawback of conventional brushes is that pressing the brush sufficiently hard against the teeth to get good cleaning risks damaging or discomforting the softer, adjacent gums. To a certain extent this can be solved by modifying the configuration of the brush, or by varying bristle hardness or length, though again, a single configuration cannot be optimum for all circumstances.

Some brushes may, however, incorporate a means for allowing the head to flex relative to the handle, as described for example in EP-A-371,293. Even so, such brushes have limited effectiveness. Other brushes are known which are adjustable into several different but fixed configurations. Adjustable toothbrushes are often difficult to manipulate and may be unreliable.

WO 92/17093 discloses a toothbrush having a handle and at one end thereof a bristle-bearing head, wherein the head is in the form of two or more segments flexibly and resiliently linked to each other and/or to the handle, one or more of the segments being bristle bearing. In one embodiment this is achieved by the use of transverse, and optionally longitudinal, grooves on the opposite face of the head to the bristles. The grooves can be wholly or partially filled with an elastomer.

Co-filed application WO 92/17092 further discloses a toothbrush having a handle and at one end thereof a bristle-bearing head which is flexibly and resiliently linked to an extended portion of the handle. The space between the head and the handle may be filled with an elastomer. The applicant markets a brush called the 'Schwingkopf' under the name 'Dr. Best' which contains some of the features disclosed in WO 92/17092. The brush has an elastomeric handle grip and an elastomer filled groove connecting the grip to an elastomer filled region in the neck of the brush. However, the brush does not contain transverse grooves in the head.

It is well-known to provide elastomeric grips in the handles of toothbrushes. It is also known from the above-mentioned PCT applications to provide transverse grooves containing elastomer into a brush head. To the present applicant's knowledge however, it has not been disclosed how both these objects can be achieved using a conventional single-point, injection moulding process.

It has now been found that all of the elastomer filled areas of the brush can be filled by a single-point injection moulding process by providing one or more elastomer supply channels which connect the grooves in the head to the grips in the handle.

It is accordingly an object of this invention to provide a toothbrush with a flexible head and handle grips which can be made by a simple injection moulding process.

It is yet a further object of this invention to provide a toothbrush which has good long-term durability.

SUMMARY OF INVENTION

The present invention pertains to toothbrush, which in one embodiment, includes a head having a bristle face and an opposing face defining a thickness therebetween. A first elastomer filled groove is disposed on the opposing face and forms an outer facing surface of the head. A second elastomer filled groove is disposed on the bristle face of the head and is curved. Both the first groove has a first depth and the second groove has a second depth, wherein the first depth and the second depth are less than the thickness of the head.

In another embodiment, a toothbrush may comprise a head having a bristle face and an opposing face defining a thickness therebetween. A first elastomer filled recess, is disposed on the opposing face and forms an outer facing surface of the head wherein the first recess has a first depth which is less than the thickness of the head. Additionally, a second recess is disposed on the bristle face wherein the second recess has a second depth which is less than the thickness of the head, and wherein the second recess is curved.

In yet another embodiment, a toothbrush may comprise a head having a bristle-face and an opposing-face, the bristle-face and opposing-face defining a thickness therebetween. A first recess is disposed on the opposing-face and has a thickness which is less than that of the head. The first recess is filled with elastomer. A plurality of second recesses are disposed on the bristle-face, and each of the plurality of second recesses are curved. Each of the plurality of second recesses has a thickness which is less than that of the head, and wherein each of the plurality of second recesses has a width which is between about 0.5 mm to about 4 mm.

In further embodiments of the present invention the toothbrush may further comprise a resiliently flexible head attached to a proximal end of the handle, the head including a pair of opposing faces, one of the pair being a bristle-bearing face with bristles attached to and extending from the face, wherein at least one of the pair has one or more elastomer-containing, transverse grooves therein; and one or more elastomer supply channels extending between the elastomeric handle regions and the transverse grooves, whereby at least one of the elastomeric handle regions and the transverse grooves can be filled with elastomer from a single injection point.

DETAILED DESCRIPTION OF THE INVENTION

Handle

The toothbrush of this invention comprises an elongated handle having distal and proximal ends and one or more elastomeric handle regions therein. The handle can be of shape and external dimension suitable for toothbrushes. The elastomeric regions in the handle are generally designed to act as hand or finger grips but they can be provided for solely aesthetic purposes, for example to give the brush a distinctive appearance. The elastomeric regions can be flush with the surface of the handle or raised or recessed from the handle surface. Preferably at least a part of one elastomeric region is raised for providing better grip. In general the elastomeric regions are provided by initially moulding the handle to comprise voids which are then filled by the elastomer in a separate injection moulding step. The voids provide some physical entrapment of the elastomer, but preferably the elastomer is chosen so that it becomes bonded to the handle material through the injection moulding process. The voids can be arranged so that when filled with elastomer the various elastomer regions, at least when handle material is opaque, give the appearance of being completely discrete. At least one, preferably all, of the elastomeric regions in the handle is connected by the elastomer supply channel(s) described below to the transverse grooves in the head. Typically, the elastomer in the grips of the handle is a substantial part of the total volume of elastomer to be injected. For this reason the elastomer injection point is preferably located at the distal end of the handle. In this context, 'at the distal end of the handle' means that the injection point is located closer to the distal end than to the proximal end of the handle.

The handle, and also the toothbrush head, are generally made of relatively non-compressible materials, preferably with a modulus of elasticity of at least about 500 MPa, more preferably at least about 1000 MPa, which are conventional in the manufacture of toothbrushes, especially plastics materials. Suitable plastics materials include, for example, polyamides and polypropylenes. Polypropylene is preferred. Suitable polypropylenes include the material 'Polypropylene PM 1600' (marketed by Shell), having a modulus of elasticity (ISO 178) of 1500 MPa and Apryl 3400 MAI from Elf Atochem. Preferably, a foaming agent such as Hydrocerol HP2ODP from Boehringer-Mannheim is mixed with the polypropylene at a level of from about 1% to about 3%, preferably from about 1.5% to about 2.5%, by weight of the polypropylene. The foaming agent assists the flow of the polypropylene during moulding and, in particular, helps to ensure uniform formation of the hinges in the head.

Suitable elastomers for use herein include thermoplastic elastomers with a Shore hardness of 30-80 and a modulus of elasticity of less than about 500 Mpa, preferably less than about 300 MPa, such as Santoprene and Thermoflex. An exemplary elastomer is 'PTS Thermoflex 75 (marketed by Plastic Technologe Service, Germany), having a modulus of elasticity (ISO 178) of 100 MPa and a hardness (ISO 868) of 80 Shore A. Elastomers PL12291, PL12292, and PL12293 (marketed by Multibase, Saint Laurent Du Pont, France) are also suitable for use herein. In general, choosing the elastomer so that is based upon the same chemical class of polymers as material of the head segments assists in bonding the elastomer to the head segments. For example, when the head segments are made from polypropylene, the elastomer is preferably based upon polypropylene. The elastomers can optionally be mixed with a suitable plasticiser or foaming agent to make them more compressible. The colour of the elastomer material can be the same as that of the head segments, or it may be different thereby achieving a distinctive striped or otherwise patterned appearance.

The handle itself is generally rigid. Optionally, the handle may comprise a neck portion which is more flexible than the rest of the handle, as known in the art, provided that it is sufficiently rigid that, in use, when force is applied to the head, particularly when brushing the teeth, the head still flexes in the manner and to the extent described below.

Head

The toothbrush of this invention further comprises a resiliently flexible head attached to the proximal end of the handle, the head including a pair of opposing faces, one of the pair being a bristle-bearing face with bristles attached to and extending from the face, wherein at least one of the pair has one or more elastomer-containing transverse grooves therein.

Suitable materials for the head are the same as those for the handle. Preferably the head and handle are co-moulded in a single injection moulding step, so that the head and handle form one continuous piece. In any case the long axis of the handle defines a longitudinal axis of the head. The head also has a transverse axis lying orthogonal to the longitudinal axis and generally parallel to the opposed faces. References to transverse or longitudinal herein refer to directions which are respectively parallel to these transverse and longitudinal axes, unless indicated otherwise. The head itself is also generally elongated, with its elongated axis also being a longitudinal axis.

The head includes transverse grooves on at least one of the bristle-bearing face and the opposing face, the grooves dividing the head into segments. The grooves allow the head to flex or bend along its longitudinal axis. This allows the brush head to flex so that it acquires a convex profile along the longitudinal axis when pressed against the teeth. This makes it particularly suitable for brushing the lingual or inside surfaces of the teeth. The grooves can be linear or non-linear, such as curved or zigzag. Non-linear grooves help to offset compression stress in the elastomeric material filling the grooves as the head bends. The term 'transverse grooves' as used herein can also encompass grooves whose main axis, as defined by the straight line joining the start and endpoints of the grooves is offset from the transverse axis of the head by an angle of up to and including 45°. In preferred embodiments both the bristle-bearing face and the opposing face include one or more transverse grooves therein.

The head also includes one or more longitudinal grooves on at least one of the bristle-bearing face and the opposing face. The term 'longitudinal grooves' as used herein can also encompass grooves whose main axis, as defined by the straight line joining the start and endpoints of the grooves is offset from the 'longitudinal axis' of the head by an angle of up to 45°. Longitudinal grooves can allow, for example, the outer longitudinal rows of bristles to flex away from the inner ones. They also act as elastomer supply channel(s) to the transverse grooves as described below.

Where there are grooves on both of the opposing faces, grooves on one face can be directly opposed to grooves on the other face or partially or totally offset. Preferably, the grooves are directly opposed or only partially offset.

The grooves, which separate the segments of the head, also define hinges, which are thinned regions of the head at the base of the grooves.

Regarding FIGS. 2-4, grooves 4, 9 can be of variable width and depth and the distances between grooves 4 can also be varied. In this manner the flexibility of the head along the length and/or across the breadth of the head can be modified. Preferably only transverse grooves 4 are varied in this way. Changing the depth of the grooves 4 controls the location and thickness of the hinges which connect the segments. For a toothbrush head of between about 4 to about 6 mm thickness, typically about 5 mm, suitable groove depths are in the range from about 1.4 to about 3 mm, preferably from about 1.5 to about 2.8 mm. Suitable hinge thicknesses are in the range from about 0.4 to about 2.0 mm, preferably from about 0.5 to about 1.5 mm. Where transverse grooves 4 are used then, desirably, the hinges which are or will be nearer to the handle are less flexible than those which are or will be more remote from it. In this way more uniform bending of the head can be achieved. The variation in flexibility can be achieved by varying the hinge thicknesses. In a preferred embodiment the hinge nearest the handle is up to about 3 times, preferably up to about 2 times as thick as the hinge most remote from the handle. An exemplary set of hinge thicknesses for a toothbrush with 3 transverse grooves 4 are respectively about 1.2, 0.6 and 0.6 mm reading from the handle end. If identical hinges are used along the brush head then there is a tendency for flexing of the head to occur predominantly at the hinge nearest the handle. The depth of grooves 4, 9 on the bristle bearing face can be different to those on the opposing face. Preferably the grooves 4, 9 on the bristle-bearing face are less deep than those on the opposing face. In embodiments where there is elastomer in the grooves on both faces, this allows more elastomer to be put under compression than under tension. The elastomer to segment bonds are stronger under compression than under tension.

Increasing the width of the grooves increase the gap between the segments and therefore the length of the hinges, which increases their flexibility. However, since it is preferred to insert bristles into the segments rather than into the elastomer, increased groove length also leaves less space for the bristles, within a given head size. Suitable groove widths are in the range from about 0.3 to about 3.0 mm, preferably from about 1.2 to about 2.0 mm. The grooves are preferably tapered slightly inwards towards the bottom of the groove, suitably converging at an angle of from about 3 to about 10°, to facilitate moulding. As the brush is flexed the width of the groove changes, more rapidly at the top of the groove than at the bottom of the groove, the relative change being a function of the groove width and depth. Since this change in groove width results in compression or tension of elastomer contained within the groove, it can be seen that, for a given elastomer, the groove geometry can be used to control the flex angle.

The hinges can be the full length of the grooves or, preferably, there can be one or more gaps in or to the side of the hinges the grooves in these regions being the full depth of the head. The gap allows elastomer to flow from one face to the other during the moulding process so that elastomer can be used on both sides of the head and yet still supplied from a single injection point. In a preferred embodiment, the hinges are discontinuous, with two or more hinges, preferably just two, connecting each segment to its neighbour or to the handle. In this embodiment there are gaps between the hinges and to each side. In linear grooves, the hinge widths are not generally critical, provided that they are such that gaps are still created, however, wide hinges can be subject to distortion if they are used within a non-linear groove. Suitable hinge widths are in the range from about 0.5 to about 4.0 mm, preferably from about 1.0 to about 3.0 mm.

It is preferred that each hinge is located between the two faces and at a distance of at least about 10%, preferably at least about 20%, more preferably at least about 30% of the depth of the head from each of the faces. The distance of the hinge from the face is measured by the perpendicular line drawn from the top of the face to the nearest boundary surface of the centre of the hinge. Locating the hinges away from the faces of the brush means that they are subject to less stretching or compression as the head is flexed and improves their durability. In a particularly preferred embodiment, the brush head has transverse grooves which are arranged in pairs such that one member of each pair is on each face and directly opposes the other member of the pair, with one or more hinges there between connecting the segments so that each hinge is located between the two faces and at a distance of at least about 10%, preferably at least about 20%, more preferably at least about 30% of the depth of the head from each of the faces.

The grooves on at least one face of the brush contain elastomer, preferably bonded to the segments of the head. The term 'elastomer' herein refers to a material which is both elastically compressible and elastically extensible. Thus when the head is flexed in a direction orthogonal to the opposed faces, the elastomer is put either under tension or under compression. The elastomer has the effect of limiting the head flexibility thereby reducing the stretching or compression of the hinges and of limiting the stress at the bond between the elastomer and the head segments. A more durable head is thus obtained. Preferably, grooves on both the bristle-bearing face and the opposing face contain elastomer so that elastomer is put under compression whichever direction is chosen. The elastomer on the opposed face is of course put under tension but the tensile stress on the elastomer to segment bonds is limited and is shared with the hinge material.

Preferably all of the grooves are wholly filled with the elastomer. Complete filling of the grooves has an advantage of, for example, avoiding contamination of the grooves by toothpaste deposits. The grooves can be partially filled though, provided that sufficient elastomer is used to give effective moderation of the flexibility of the head.

The whole head has a conventional, generally flattened shape but remains flexible when compared to that of a conventional brush. By 'flexible' is meant herein that when a 3 Newton force is applied to one end of the head, the other end being held fixed, the end to which the force is applied will deflect through an angle of at least 2°.

The end of the head which is to be held fixed is defined by the line which is perpendicular to the axis along which bending takes place and which touches the first row of bristles. In the preferred embodiments having transverse grooves, where the head bends along the longitudinal axis, the end should be that which connects to the handle. The end of the head where the force is to be applied is the opposite end of the head at the furthest point away along the bending axis. By 'resiliently flexible' is meant that when the 3 Newton force is removed, the head will return to its original position without the application of external force. The angle through which the head bends when a 3 Newton force is applied as above is referred to herein as the flex angle. The flex angle can conveniently be measured by measuring the vertical displacement (y) of the free end of the head under a 3 Newton force and the distance y and the distance between the clamping point and the application of the force (x), the flex angle being derived by the relationship tan (flex angle)=y/x. In preferred embodiments the flex angle is at least 3°, more preferably at least 5° and it can be as high as 15° or more. The construction of the head, in particular the dimensions of the grooves and hinges, the extent of elastomer filling of the grooves and hardness of the elastomer is, however, such that the flex angle is limited to less than about 40°, preferably less than 30°, more preferably less than 20°. This has been found to give an acceptable degree of flexibility for users without exposing the hinges and elastomer-segment bonds to undue stress.

In highly preferred embodiments, only one of the opposed faces is bristle-bearing and when the head is in its normal unstressed state, the free ends of bristles lying along a longitudinal axis of the brush form a generally concave profile. In highly preferred embodiments, the bristle-bearing face is concavely shaped. In these embodiments the head preferably has a flex angle such that the bristle-bearing face of the head is able to bend to the extent that the free ends of bristles lying along a longitudinal axis of the brush form a generally convex profile. The face of the head can be concave along either or both of the orthogonal axes of the head lying within the general plane of the bristle-bearing face. Where the face is concave along the longitudinal axis, the radius of curvature may vary along the length of the head. The radius of curvature is preferably from 10 to 500 mm, more preferably from 15 to 250 mm, especially from 25 to 150 mm.

The brush head has bristles extending from one of the pair of opposing faces. The bristles can be made of any of the materials well known in the art. Suitable bristle materials herein are polyester and nylon, such as Dupont Nylon 612. The bristles are preferably of circular cross-section but can also be of other cross-sections including, but not limited to, rectangular, hexagonal and trilocular. Furthermore, the diameter and length of the bristles can vary within the usual dimensions known by a person skilled in the art. The bristles are generally conventionally grouped into tufts and can be attached to the brush head by a variety of processes. Preferred processes herein are stapling and fusion. The bristles can be inserted into the segments or the elastomer, preferably into the harder material of the segments. Cutting and end-rounding of the bristles can be done using any of the methods commonly known in the art.

Supply Channels

A further essential feature of the toothbrush of this invention is one or more elastomer supply channels extending between the elastomeric handle regions and the transverse grooves, whereby at least one, preferably all, of the elastomeric handle regions and the transverse grooves can be filled with elastomer from a single injection point. In the head these are conveniently provided by one or more longitudinal grooves intersecting the transverse grooves.

In especially preferred embodiments the brush head comprises both transverse grooves on each of the opposed faces so that the head can bend along the longitudinal axis and at least one longitudinal groove which connects the transverse grooves and extending along the handle to connect further with the voids that are used to form the handle grips. The longitudinal groove permits molten elastomer to flow from an injection point to the elastomeric handle regions and then further to the transverse grooves in the head.

This is generally achieved by a separate injection moulding step after the moulding of the handle and the segments of the head has been completed. Preferably, all of the elastomer is injected from a single injection point. A preferred method of making the toothbrush of the invention comprises the step of injecting molten elastomer, preferably at a temperature in the range from about 220° C. to about 260° C., more preferably from about 230° C. to about 250° C., under pressure, into the injection point and causing it to flow along the supply channel and into the grooves. Suitable injection pressures are in the range from about 35 MNm$^{-2}$ (350 bar) to about 50 MNm$^{-2}$ (500 bar), preferably from about 42 MNm$^{-2}$ (420 bar) to about 48 MNm$^{-2}$ (480 bar).

In use, toothbrushes comprising the brush head of this invention can be used for cleaning the teeth by an entirely conventional tooth brushing hand action, preferably in a manner recommended by dental health authorities. The brush head of the invention can also be used in electrically driven toothbrushes or children's toothbrushes.

The invention will now be described by way of example only, with reference to the accompanying drawings in which.

Figure 1:
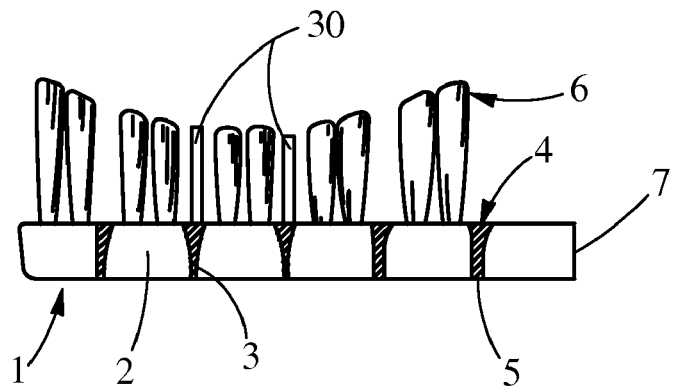
FIG. 1 is a partial side view of a first embodiment of the invention, depicting the toothbrush head with transverse grooves. Although the head is flat in its unstressed state, the bristles are cut to different lengths so that the bristle surface is concave along the longitudinal direction.

Referring to FIG. 1, the brush head (1) has substantially parallel top and bottom faces, comprising segments (2) flexibly connected by hinges of head material (3). The top and bottom faces carry equal numbers of generally parallel transverse grooves (4) filled with elastomer (5). A longitudinal groove (not shown) connects the transverse grooves and extends into the handle (8), acting as a supply channel. Tufts of bristles (6), extending from the top face, form a concave surface (7) at their free ends. As shown, the elastomer 5 of the head may comprise cleaning elements 30.

Figure 2:
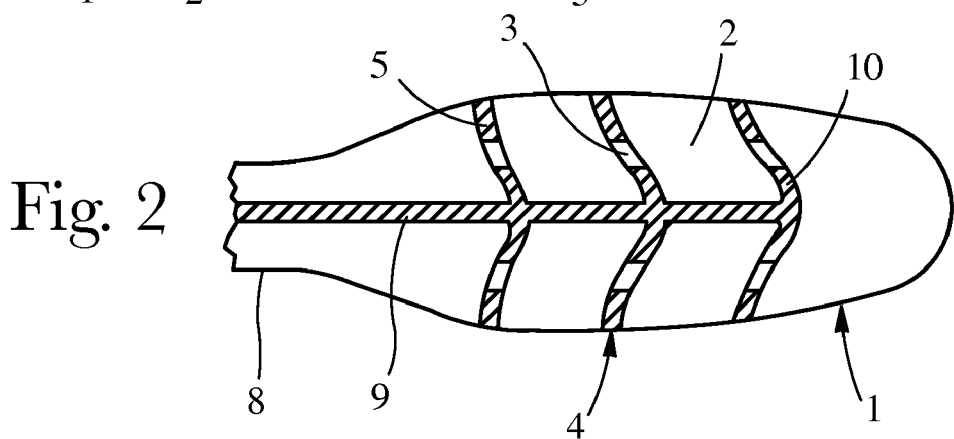
FIG. 2 is a plan view of a toothbrush head showing transverse grooves, a longitudinal groove acting as a supply channel, and discontinuous hinges. The bristles are omitted for the sake of clarity.

Referring to FIG. 2, a toothbrush head (1) is formed integrally at one end of a handle (8). The head includes three pairs of transverse grooves (4), one of each pair being on each of the top and bottom surfaces. The transverse grooves are in the form of waves and a single longitudinal groove (9) connects the transverse grooves and extends into the handle, acting as a supply channel. The grooves are entirely filled with elastomer (5). The transverse grooves define segments of the head (2) which are connected to each other by hinges (3). There are gaps (10) between and to each side of the hinges so that in the gaps, the elastomer extends from top to bottom surfaces.

Figure 3:
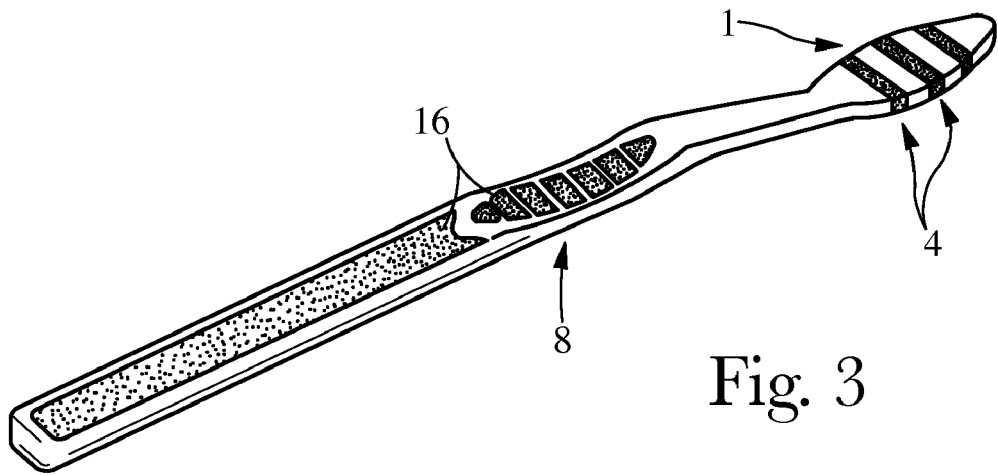
FIG. 3 is a perspective view of a toothbrush according to the invention. The bristles are omitted for the sake of clarity.
Figure 4:
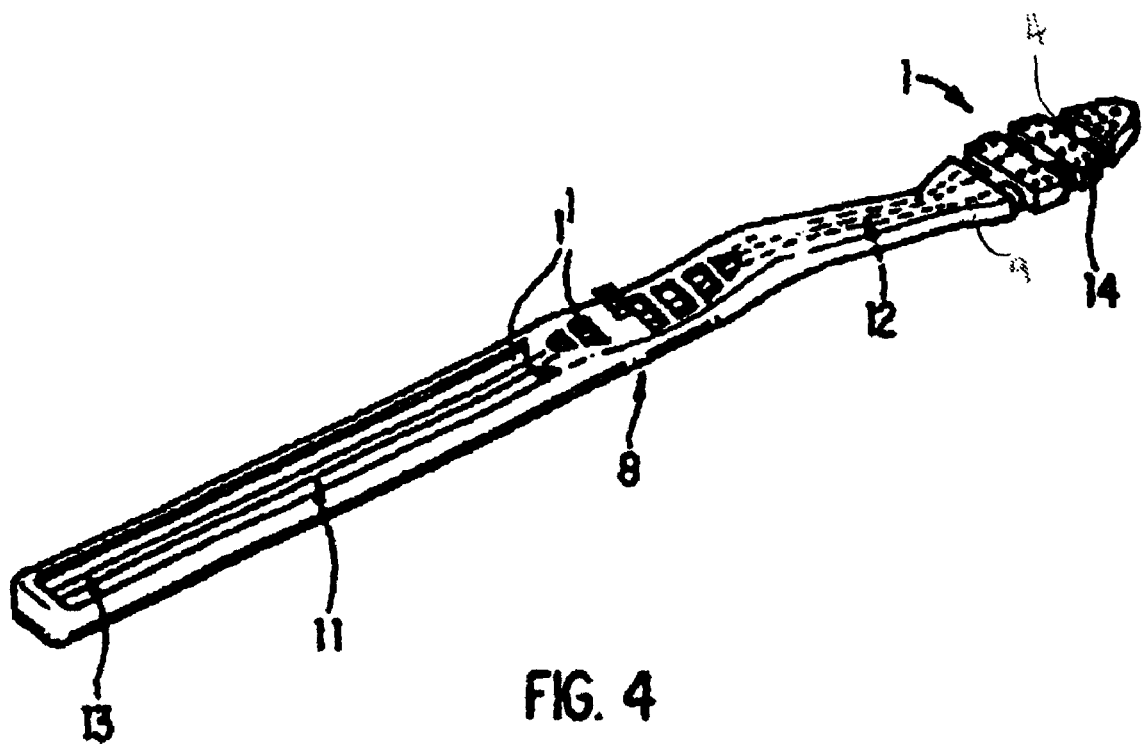
FIG. 4 is a perspective view of the toothbrush shown in FIG. 3 with the elastomer not shown in order to show the hinges, grooves and supply channel more clearly.

In FIGS. 3 and 4 the head (1) is co-moulded with the handle (8) and is concave along its longitudinal axis on the bristle-bearing (upper) surface. Voids (11) in the handle are filled with elastomer to provide hand grips (16). The voids are connected to each other by a longitudinal groove (12) on the reverse side of the handle which extends into the head and connects the transverse grooves (4) as shown in the view in FIG. 2. The elastomer in the voids and the grooves is injected from a single injection point (13) and is of a different colour to the head material to give a distinctive appearance. The head has holes (14) disposed on the top surface thereof to accommodate tufts of bristles.

Figure 5:
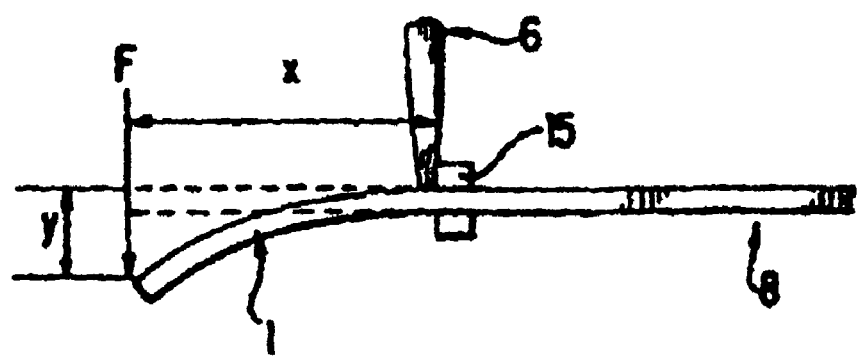
FIG. 5 is a schematic showing the measurement of the flex angle.

FIG. 5 illustrates the measurement of the flex angle. The head (1) is clamped (15) against the first row of bristles (6) at the end which is attached to the handle (8) and a 3 Newton force (F) is applied to the opposite end. The dashed lines show the original position of the brush head before the force is applied. The vertical displacement (y) of the free end of the head under the force F is measured and the flex angle is derived from the distance y and the distance between the clamping point and the application of the force (x) by the relationship tan(flex angle)=y/x.

What is claimed is:

1. A toothbrush comprising:
    a handle and a head attached to the handle, the head having a bristle face and an opposing face defining a thickness therebetween;
    a first elastomer filled groove disposed on the opposing face and forming an outer facing surface of the head wherein the first elastomer filled groove has a first depth which is less than the thickness of the head; and
    a second elastomer filled groove disposed on the bristle face wherein the second elastomer filled groove has a second depth which is less than the thickness of the head, wherein the second elastomer filled groove is curved, wherein the handle has an elastomeric region extending from the handle to the first elastomer filled groove, and wherein the elastomeric region and the first elastomer filled groove comprise the same elastomeric material,
    wherein the first elastomer filled groove is aligned with a longitudinal axis of the toothbrush.

2. The toothbrush of claim 1, wherein the second elastomer filled groove is tapered.

3. The toothbrush of claim 1, wherein the head comprises at least one elastomer filled gap extending through the head.

4. The toothbrush of claim 3, wherein the first elastomer-filled groove or second elastomer-filled groove comprises at least one cleaning element.

5. The toothbrush of claim 4, wherein the at least one cleaning element has a non-circular cross section.

6. The toothbrush of claim 4, wherein the at least one cleaning element is a tuft of bristles.

7. A toothbrush comprising:
    a handle having a head attached thereto, the head having a bristle face and an opposing face defining a thickness therebetween;
    a first elastomer filled recess disposed on the opposing face and forming an outer facing surface of the head wherein the first elastomer filled recess has a first depth which is less than the thickness of the head; and
    a second elastomer filled recess disposed on the bristle face wherein the second elastomer filled recess has a second depth which is less than the thickness of the head, and wherein the second elastomer filled recess is curved, wherein the handle has an elastomeric region extending from the handle to the first elastomer filled recess, and wherein the elastomeric region and the first elastomer filled recess comprise the same elastomeric material,
    wherein the first elastomer filled recess is aligned with a longitudinal axis of the toothbrush.

8. The toothbrush of claim 7, wherein the second elastomer filled recess is tapered.

9. The toothbrush of claim 7, wherein the head comprises at least one elastomer filled gap extending through the head.

10. The toothbrush of claim 9, wherein the first elastomer-filled recess or the second elastomer-filled recess comprise at least one cleaning element.

11. The toothbrush of claim 10, wherein the at least one cleaning element has a non-circular cross section.

12. The toothbrush of claim 10, wherein the at least one cleaning element is a tuft of bristles.

13. A toothbrush comprising:
    a handle and a head attached to the handle, the head having a bristle face and an opposing face defining a thickness therebetween;
    a first elastomer filled groove disposed on the opposing face and forming an outer facing surface of the head wherein the first elastomer filled groove has a first depth which is less than the thickness of the head; and
    a second elastomer filled groove disposed on the bristle face wherein the second elastomer filled groove has a second depth which is less than the thickness of the head, wherein the second elastomer filled groove is curved, wherein the handle has an elastomeric region extending from the handle to the first elastomer filled groove, and wherein the elastomeric region and the first elastomer filled groove comprise the same elastomeric material; and
    a plurality of elastomer filled grooves extending outward from the first groove.

14. The toothbrush of claim 13, wherein the elastomeric handle region comprises an elastomeric material which is based upon the same chemical class of material as the handle.

15. The toothbrush of claim 14, wherein the handle comprises polypropylene and wherein the elastomeric material comprises polypropylene.

16. The toothbrush of claim 13, wherein the handle has a surface and comprises one or more elastomer filled voids forming one or more elastomeric regions, wherein a portion of the one or more elastomeric regions is flush with, raised, or recessed from the surface.

17. A toothbrush comprising:
    a handle and a head attached to the handle, the head having a bristle face and an opposing face defining a thickness therebetween;
    a first elastomer filled groove disposed on the opposing face and forming an outer facing surface of the head wherein the first elastomer filled groove has a first depth which is less than the thickness of the head; and
    a second elastomer filled groove disposed on the bristle face wherein the second elastomer filled groove has a second depth which is less than the thickness of the head, wherein the second elastomer filled groove is curved, wherein the handle has an elastomeric region extending from the handle to the first elastomer filled groove, and wherein the elastomeric region and the first elastomer filled groove comprise the same elastomeric material,
    wherein the first elastomer filled groove or the second elastomer filled groove comprise at least one cleaning element.

18. The toothbrush of claim 17, wherein the second elastomer filled groove has a varying thickness.

19. The toothbrush of claim 17 further comprising a plurality of elastomer filled grooves disposed on the head.

20. The toothbrush of claim 17, wherein the elastomeric handle region comprises an elastomeric material which is based upon the same chemical class of material as the handle.

21. The toothbrush of claim 20, wherein the handle comprises polypropylene and wherein the elastomeric material comprises polypropylene.

22. The toothbrush of claim 17, wherein the handle has a surface and comprises one or more elastomer filled voids forming one or more elastomeric regions, wherein a portion of the one or more elastomeric regions is flush with, raised, or recessed from the surface.

23. The toothbrush of claim 17, wherein the at least one cleaning element has a rectangular non-circular cross section.

24. The toothbrush of claim 17, wherein the at least one cleaning element is a tuft of bristles.

25. A toothbrush comprising:
    a handle having a head attached thereto, the head having a bristle face and an opposing face defining a thickness therebetween;
    a first elastomer filled recess disposed on the opposing face and forming an outer facing surface of the head wherein the first elastomer filled recess has a first depth which is less than the thickness of the head; and a second elastomer filled recess disposed on the bristle face wherein the second elastomer filled recess has a second depth which is less than the thickness of the head, and wherein the second elastomer filled recess is curved, wherein the handle has an elastomeric region extending from the handle to the first elastomer filled recess, and wherein the elastomeric region and the first elastomer filled recess comprise the same elastomeric material, wherein the first elastomer filled recess or the second elastomer filled recess comprise at least one cleaning element.

26. The toothbrush of claim 25 wherein the second elastomer filled recess has a varying width.

27. The toothbrush of claim 25, wherein the at least one cleaning element has a non-circular cross section.

28. The toothbrush of claim 25, wherein the at least one cleaning element is a tuft of bristles.

29. A toothbrush comprising:
a handle having a head attached thereto, the head having a bristle face and an opposing face defining a thickness therebetween;
a first elastomer filled groove disposed on the opposing face and forming an outer facing surface of the head wherein the first elastomer filled groove has a first depth which is less than the thickness of the head; and
a second elastomer filled groove disposed on the bristle face wherein the second elastomer filled groove has a second depth which is less than the thickness of the head, wherein the second elastomer filled groove is curved, and wherein the first elastomer filled groove is aligned with a longitudinal axis of the toothbrush.

30. The toothbrush of claim 29, wherein the first elastomer filled groove has a length and a width, wherein the length of the first elastomer filled groove is generally parallel to the longitudinal axis.

31. The toothbrush of claim 29, further comprising a plurality of elastomer filled grooves disposed on the bristle face.

32. The toothbrush of claim 31, wherein each of the plurality of elastomer filled grooves disposed on the bristle face are curved.

33. The toothbrush of claim 29 wherein the first and/or second elastomer filled groove has a depth of between about 1.4 mm to about 3 mm.

34. The toothbrush of claim 29, further comprising an elastomeric handle region, wherein the elastomeric handle region comprises an elastomeric material which is based upon the same chemical class of material as the handle.

35. The toothbrush of claim 34, wherein the handle comprises polypropylene and wherein the elastomeric material comprises polypropylene.

36. The toothbrush of claim 35, wherein the at least one cleaning element has a non-circular cross section.

37. The toothbrush of claim 36, wherein the at least one cleaning element comprise a tuft of bristles.

38. The toothbrush of claim 36, wherein the at least one cleaning element has a non-circular cross section.

39. The toothbrush of claim 29, wherein the head comprises at least one elastomer filled gap extending through the head.

40. The toothbrush of claim 29, wherein the first groove has a bottom disposed at least about 10 percent of the thickness of the head from the opposing face.

41. The toothbrush of claim 40, wherein the bottom has a thickness of between about 0.4 mm to about 2.0 mm.

42. The toothbrush of claim 29, wherein the first elastomer filled groove has a bottom having a gap therein, the gap extending through the bottom such that the first elastomer filled groove and the second elastomer filled groove are in communication with one another.

43. A toothbrush comprising:
a handle having a head attached thereto, the head having a bristle face and an opposing face defining a thickness therebetween;
a first elastomer filled recess disposed on the opposing face and forming an outer facing surface of the head wherein the first elastomer filled recess has a first depth which is less than the thickness of the head; and
a second elastomer filled recess disposed on the bristle face wherein the second elastomer filled recess has a second depth which is less than the thickness of the head, wherein the second elastomer filled recess is curved, and wherein the first elastomer filled recess is aligned with a longitudinal axis of the toothbrush.

44. The toothbrush of claim 43, wherein the first elastomer filled recess has a length and a width, wherein the length of the first elastomer filled recess is generally parallel to the longitudinal axis.

45. The toothbrush of claim 43, further comprising a plurality of elastomer filled recesses disposed on the bristle face.

46. The toothbrush of claim 45, wherein each of the plurality of elastomer filled recesses disposed on the bristle face are curved.

47. The toothbrush of claim 43 wherein the first and/or second elastomer filled recess has a depth of between about 1.4 mm to about 3 mm.

48. The toothbrush of claim 43, further comprising an elastomeric handle region, wherein the elastomeric handle region comprises an elastomeric material which is based upon the same chemical class of material as the handle.

49. The toothbrush of claim 48, wherein the handle comprises polypropylene and wherein the elastomeric material comprises polypropylene.

50. The toothbrush of claim 43, wherein the first elastomer filled recess or the second elastomer filled recess comprise at least one cleaning element.

51. The toothbrush of claim 50, wherein the at least one cleaning element comprises a tuft of bristles.

52. The toothbrush of claim 50, wherein the at least one cleaning element has a non-circular cross section.

53. The toothbrush of claim 49, wherein the head comprises at least one elastomer filled gap extending through the head.

54. The toothbrush of claim 43, wherein the first recess has a bottom disposed at least about 10 percent of the thickness of the head from the opposing face.

55. The toothbrush of claim 54, wherein the bottom has a thickness of between about 0.4 mm to about 2.0 mm.

56. The toothbrush of claim 43, wherein the first elastomer filled recess has a bottom having a gap therein, the gap extending through the bottom such that the first elastomer filled recess and the second elastomer filled recess are in communication with one another.

57. A toothbrush comprising:
a handle having a head attached thereto, the head having a bristle face and an opposing face defining a thickness therebetween;
a first elastomer filled recess disposed on the opposing face and forming an outer facing surface of the head wherein the first elastomer filled recess has a first depth which is less than the thickness of the head;

a second elastomer filled recess disposed on the bristle face wherein the second elastomer filled recess has a second depth which is less than the thickness of the head, wherein the second elastomer filled recess is curved; and a plurality of elastomer filled recesses extending outward from the first recess.

58. The toothbrush of claim 57, the plurality of elastomer filled recesses comprise a cleaning element.

59. The toothbrush of claim 58, wherein the cleaning element comprise a tuft of bristles.

60. The toothbrush of claim 58, wherein the cleaning element has a non- circular cross section.

61. A toothbrush comprising:
a handle having a head attached thereto, the head having a bristle face and an opposing face defining a thickness therebetween;
a first elastomer filled groove disposed on the opposing face and forming an outer facing surface of the head wherein the first elastomer filled groove has a first depth which is less than the thickness of the head; and
a second elastomer filled groove disposed on the bristle face wherein the second elastomer filled groove has a second depth which is less than the thickness of the head, wherein the second elastomer filled groove is curved; and
at least one cleaning element extending from the elastomer of the first elastomer filled groove or the second elastomer filled groove.

62. The toothbrush of claim 61, further comprising a plurality of elastomer filled grooves disposed on the bristle face.

63. The toothbrush of claim 62, wherein each of the plurality of elastomer filled grooves disposed on the bristle face are curved.

64. The toothbrush of claim 61 wherein the first and/or second elastomer filled groove has a depth of between about 1.4 mm to about 3 mm.

65. The toothbrush of claim 61, further comprising an elastomeric handle region, wherein the elastomeric handle region comprises an elastomeric material which is based upon the same chemical class of material as the handle.

66. The toothbrush of claim 65, wherein the handle comprises polypropylene and wherein the elastomeric material comprises polypropylene.

67. The toothbrush of claim 61, wherein the at least one cleaning element comprise a tuft of bristles.

68. The toothbrush of claim 67, wherein the at least one cleaning element has a non-circular cross section.

69. The toothbrush of claim 61, wherein the head comprises at least one elastomer filled gap extending through the head.

70. The toothbrush of claim 61, wherein the first elastomer filled groove has a bottom disposed at least about 10 percent of the thickness of the head from the opposing face.

71. The toothbrush of claim 70, wherein the bottom has a thickness of between about 0.4 mm to about 2.0 mm.

72. The toothbrush of claim 61, wherein the first elastomer filled groove has a bottom having a gap therein, the gap extending through the bottom such that the first elastomer filled groove and the second elastomer filled groove are in communication with one another.

73. The toothbrush of claim 61, wherein the first elastomer filled groove or the second elastomer filled groove comprise a plurality of cleaning elements.

74. A toothbrush comprising:
a handle having a head attached thereto, the head having a bristle face and an opposing face defining a thickness therebetween;
a first elastomer-filled recess disposed on the opposing face and forming an outer facing surface of the head wherein the first elastomer filled recess has a first depth which is less than the thickness of the head;
a second elastomer-filled recess disposed on the bristle face wherein the second elastomer filled recess has a second depth which is less than the thickness of the head, wherein the second elastomer filled recess is curved; and
at least one cleaning element extending from the elastomer of the first elastomer filled recess or the second elastomer filled recess.

75. The toothbrush of claim 74, further comprising a plurality of elastomer filled recesses disposed on the bristle face.

76. The toothbrush of claim 75, wherein each of the plurality of elastomer filled recesses disposed on the bristle face are curved.

77. The toothbrush of claim 74 wherein the first and/ or second elastomer filled recess has a depth of between about 1.4 mm to about 3 mm.

78. The toothbrush of claim 74, further comprising an elastomeric handle region, wherein the elastomeric handle region comprises an elastomeric material which is based upon the same chemical class of material as the handle.

79. The toothbrush of claim 78, wherein the handle comprises polypropylene and wherein the elastomeric material comprises polypropylene.

80. The toothbrush of claim 74, wherein the at least one cleaning element has a non-circular cross section.

81. The toothbrush of claim 73, wherein the at least one cleaning element comprise a tuft of bristles.

82. The toothbrush of claim 74, wherein the head comprises at least one elastomer filled gap extending through the head.

83. The toothbrush of claim 74, wherein the first groove has a bottom disposed at least about 10 percent of the thickness of the head from the opposing face.

84. The toothbrush of claim 83, wherein the bottom has a thickness of between about 0.4 mm to about 2.0 mm.

85. The toothbrush of claim 74, wherein the first elastomer filled rercess has a bottom having a gap therein, the gap extending through the bottom such that the first elastomer filled recess and the second elastomer filled recess are in communication with one another.

86. A toothbrush comprising:
a handle having a head attached thereto, the head having a bristle face and an opposing face defining a thickness therebetween;
a first elastomer filled groove disposed on the opposing face and forming an outer facing surface of the head wherein the first elastomer filled groove has a first depth which is less than the thickness of the head;
a second elastomer filled groove disposed on the bristle face wherein the second elastomer filled groove has a second depth which is less than the thickness of the head, wherein the second elastomer filled groove is curved; and
a plurality of elastomer filled grooves extending outward from the first elastomer filled groove.

87. The toothbrush of claim 86, wherein the plurality of elastomer filled grooves comprise a cleaning element.

88. The toothbrush of claim 87, wherein the cleaning element comprises a tuft of bristles.

89. The toothbrush of claim 87, wherein the cleaning element has a non- circular cross section.

90. A toothbrush comprising:
- a handle having a head attached thereto, the head having a bristle face and an opposing face defining a thickness therebetween;
- a first elastomer filled groove disposed on the opposing face and forming an outer facing surface of the head wherein the first elastomer filled groove has a first depth which is less than the thickness of the head; and
- a second elastomer filled groove disposed on the bristle face wherein the second elastomer filled groove has a second depth which is less than the thickness of the head, wherein the second elastomer filled groove is curved, and wherein the first elastomer filled groove or the second elastomer filled groove comprise at least one cleaning element.

91. The toothbrush of claim 90, wherein the at least one cleaning element is a tuft of bristles.

92. The toothbrush of claim 90, wherein the at least one cleaning element has a non-circular cross section.

93. The toothbrush of claim 90, wherein the head comprises at least one elastomer filled gap extending through the head.

94. The toothbrush of claim 90, wherein the first elastomer filled groove has a bottom disposed at least about 10 percent of the thickness of the head from the opposing face.

95. The toothbrush of claim 94, wherein the bottom has a thickness of between about 0.4 mm to about 2.0 mm.

96. The toothbrush of claim 90, wherein the first elastomer filled groove has a bottom having a gap therein, the gap extending through the bottom such that the first elastomer filled groove and the second elastomer filled groove are in communication with one another.

97. A toothbrush comprising:
- a handle having a head attached thereto, the head having a bristle face and an opposing face defining a thickness therebetween;
- a first elastomer filled recess disposed on the opposing face and forming an outer facing surface of the head wherein the first elastomer filled recess has a first depth which is less than the thickness of the head; and
- a second elastomer filled recess disposed on the bristle face wherein the second elastomer filled recess has a second depth which is less than the thickness of the head, wherein the second elastomer filled recess is curved, and wherein the first elastomer filled recess or the second elastomer filled recess comprise at least one cleaning element.

98. The toothbrush of claim 97, wherein the at least one cleaning element is a tuft of bristles.

99. The toothbrush of claim 97, wherein the at least one cleaning element has a non-circular cross section.

100. The toothbrush of claim 97, wherein the head comprises at least one elastomer filled gap extending through the head.

101. The toothbrush of claim 97, wherein the first elastomer filled recess has a bottom disposed at least about 10 percent of the thickness of the head from the opposing face.

102. The toothbrush of claim 101, wherein the bottom has a thickness of between about 0.4 mm to about 2.0 mm.

103. The toothbrush of claim 97, wherein the first elastomer filled recess has a bottom having a gap therein, the gap extending through the bottom such that the first elastomer filled recess and the second elastomer filled recess are in communication with one another.

* * * * *